Figure 1:
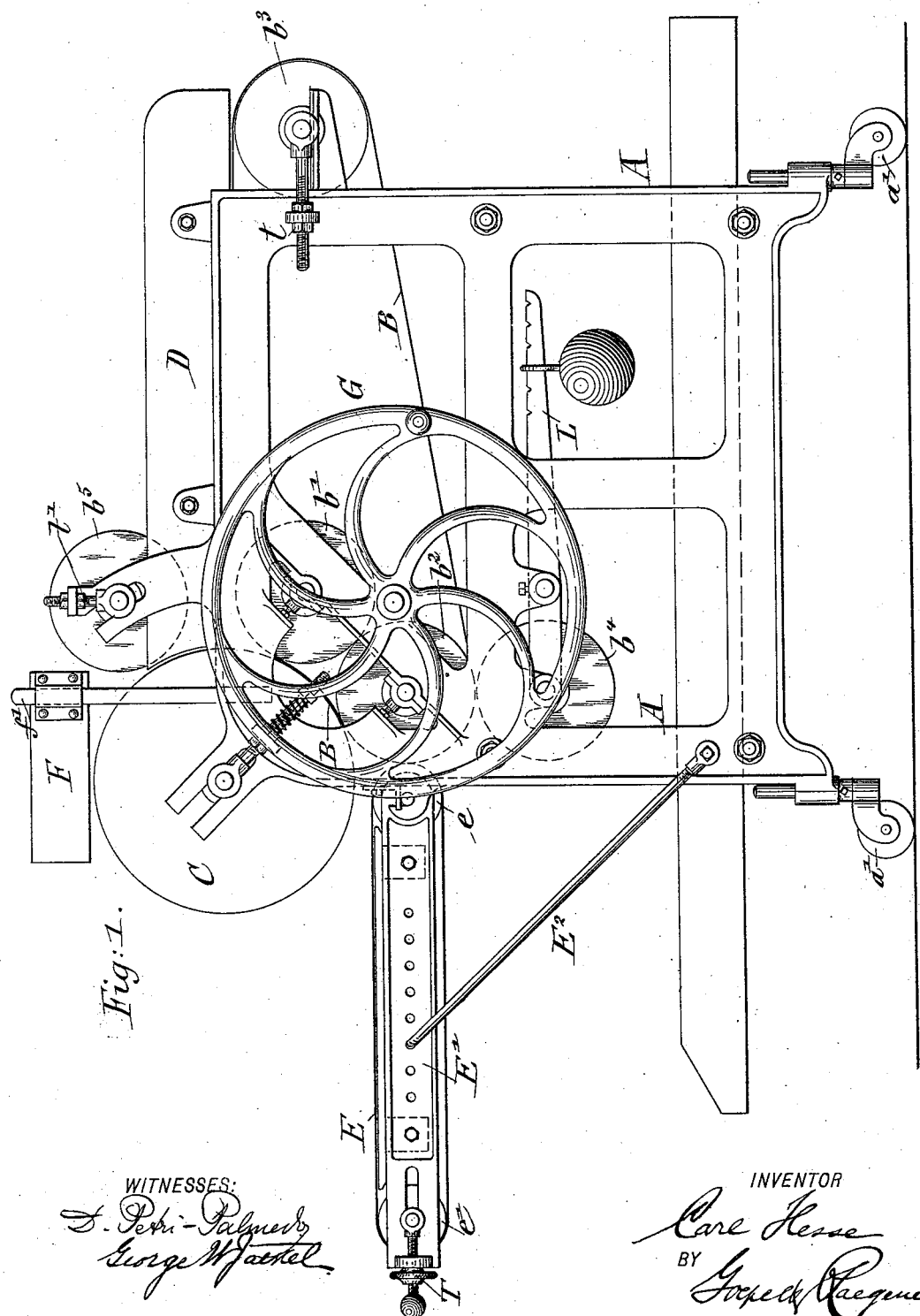

(No Model.) 3 Sheets—Sheet 1.

C. HESSE.
DOUGH DIVIDING MACHINE.

No. 546,488. Patented Sept. 17, 1895.

WITNESSES:

INVENTOR
Carl Hesse
BY
ATTORNEYS.

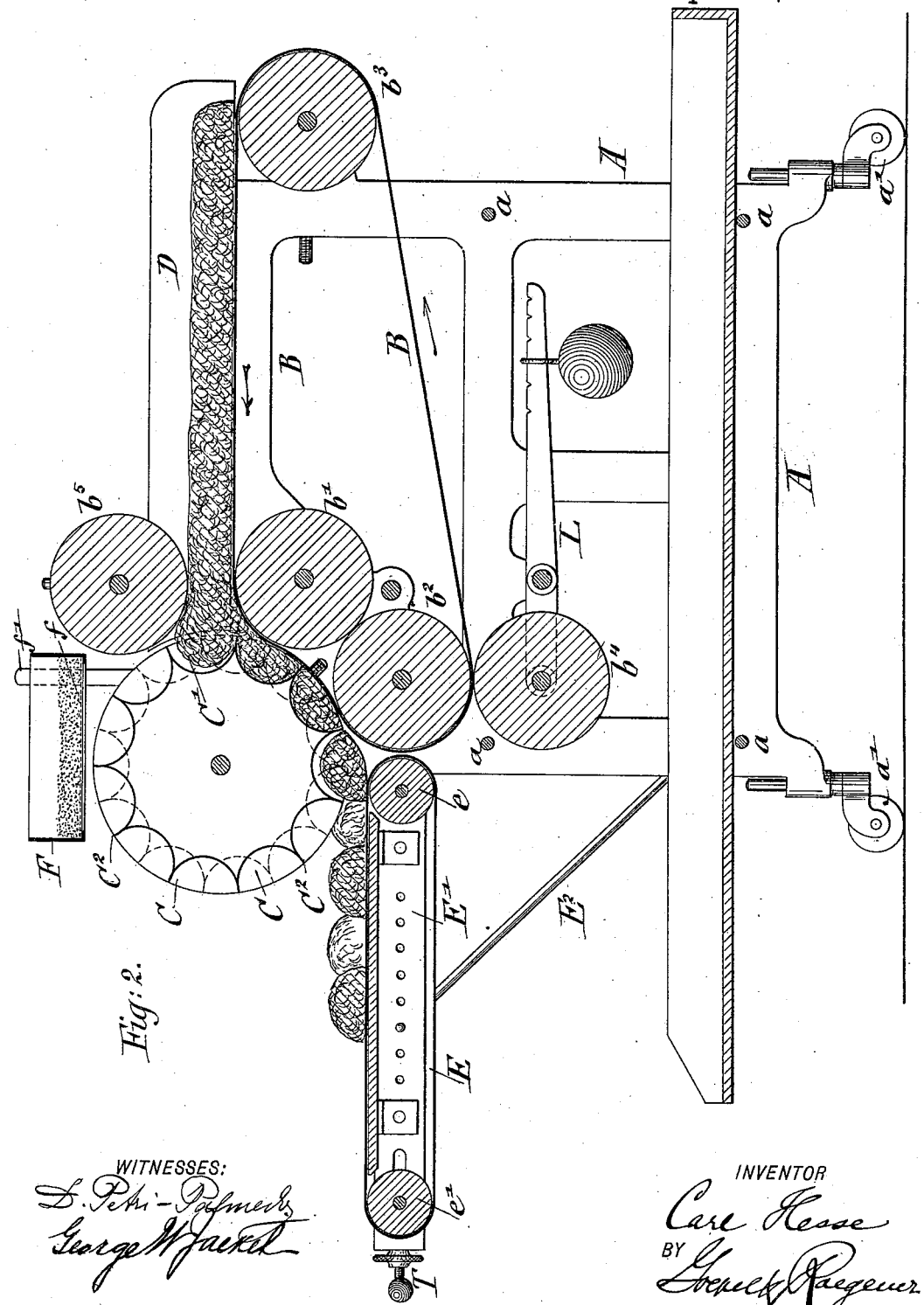

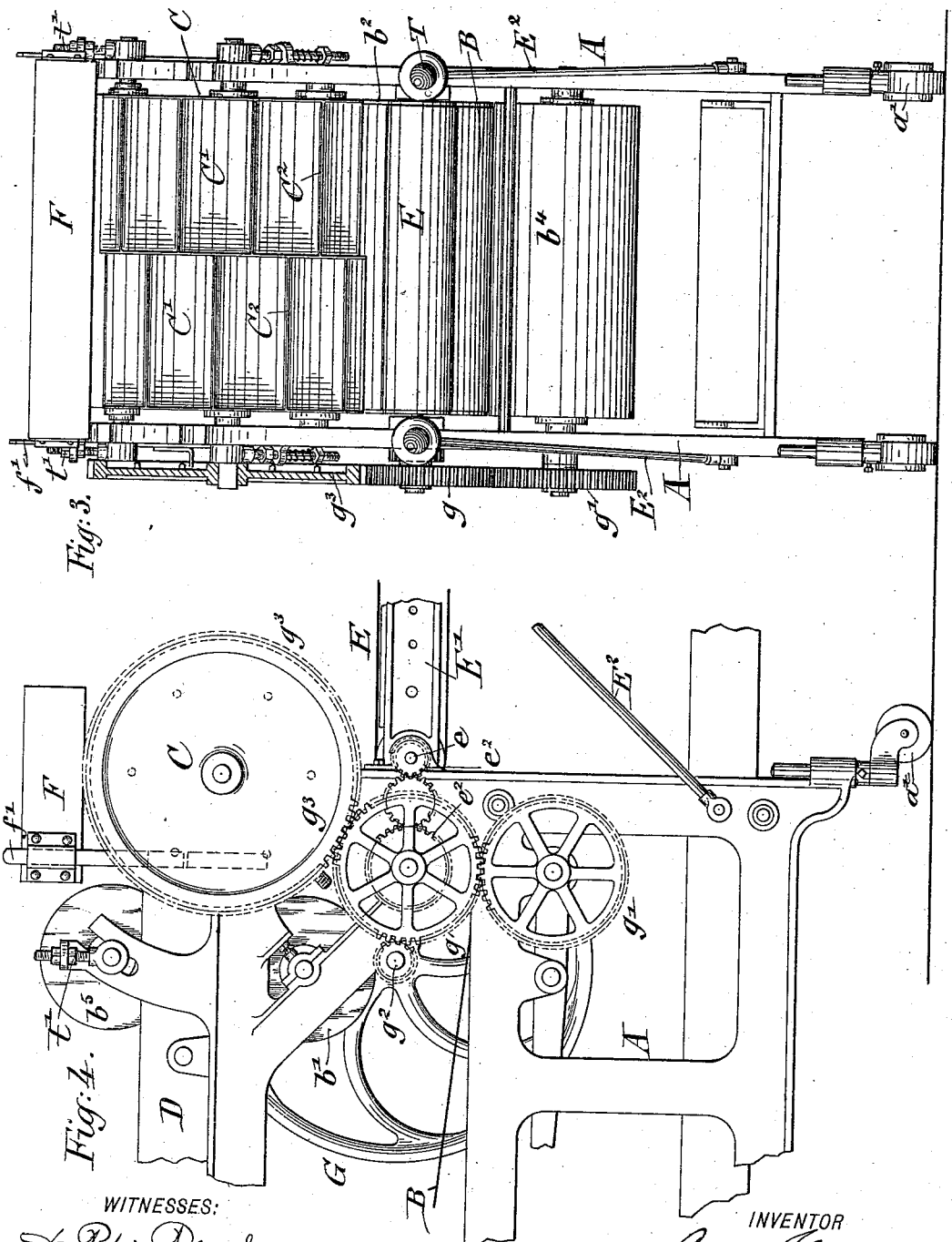

UNITED STATES PATENT OFFICE.

CARL HESSE, OF LONG ISLAND CITY, NEW YORK.

DOUGH-DIVIDING MACHINE.

SPECIFICATION forming part of Letters Patent No. 546,488, dated September 17, 1895.

Application filed January 8, 1895. Serial No. 534,169. (No model.)

*To all whom it may concern:*

Be it known that I, CARL HESSE, a citizen of the United States, residing at Long Island City, in the county of Queens and State of New York, have invented certain new and useful Improvements in Dough-Dividing Machines, of which the following is a specification.

This invention has reference to an improved machine for dividing the dough used for making bread, rolls, &c., into pieces of uniform size, so as to dispense with the hand-labor required for this purpose, and to accomplish it in a much quicker and more effective manner than heretofore; and the invention consists of a dough-dividing machine, which comprises an endless dough-feeding belt, two adjacent rollers arranged at one end of the belt, a roller at the opposite end of the belt, a roller for regulating the thickness of the dough, a rotary dividing-cylinder the circumference of which is divided into a number of pockets or matrices corresponding to the size of the loaves, rolls, &c., said cylinder rotating in contact with that portion of the endless dough-feeding belt which is between said two adjacent rollers, and an endless table for feeding the loaves, rolls, &c., as they are delivered by the dividing-cylinder.

The invention consists, further, of a box provided with a bottom screen and adapted to screen flour into the pockets of the dough-dividing cylinder; and the invention consists, finally, in certain details of construction, which will be fully described hereinafter, and finally pointed out in the claims.

In the accompanying drawings, Figure 1 represents a side elevation of my improved machine for dividing dough into pieces of the required shape for forming loaves, rolls, &c. Fig. 2 is a vertical longitudinal section of the same. Fig. 3 is a front elevation, and Fig. 4 a side elevation showing the transmitting gear-wheels by which motion is imparted to the different parts of the machine.

Similar letters of reference indicate corresponding parts.

Referring to the drawings, A $a$ represents the supporting-frame of my improved dough-dividing machine, which frame is composed of two vertical side standards A, which are connected by transverse braces $a$. The supporting-frame A $a$ is preferably placed on casters $a'$, so as to be easily removed to the place required, and provided with bearings for the journals of the various rollers by which the dough is fed to the dividing-cylinder. The dough, after the same is properly mixed and kneaded, is placed on an endless feed-belt B, which is tightly stretched over three rollers $b'$ $b^2$ $b^3$. The rollers $b'$ $b^2$ are arranged closely to each other and adjacent to the dough-dividing cylinder C. The roller $b^3$ is arranged at the end of the machine and is adjustable in its bearings by suitable well-known tension devices $t$, (shown in Fig. 1,) so that the belt B is caused to hug the rollers $b'$ $b^2$ $b^3$ tightly. A fourth roller $b^4$ is arranged directly below the roller $b^2$ and is supported in bearings of fulcrumed and weighted levers L, by which the roller $b^4$ is pressed against the feed-belt B, so that the forward motion of the feed-belt is imparted by the two rollers $b^2$ and $b^4$ in the direction indicated by the arrows in Fig. 2. Motion is transmitted to the rollers $b^2$ $b^4$ by means of gear-wheels $g$ $g'$, from a pinion $g^2$ on the shaft of the fly-wheel G, which shaft is rotated either by hand or power, the gear-wheel $g$ also imparting motion to a gear-wheel $g^3$, on the shaft of the dough-dividing cylinder C, as shown in Fig. 4. The rollers $b'$ $b^3$ and the roller $b^5$, which is supported in suitable bearings at the upper part of the frame A and above the upper part of the belt B, receive no direct rotary motion, but are rotated respectively by the feed-belt B and by the forward motion of the dough. The upper roller $b^5$, can be adjusted higher or lower in its bearings by suitable adjusting devices $t'$, and regulates thereby the thickness of the dough fed to the dough-dividing cylinder C. The dough is placed on the upper part of the dough-feeding belt B, and retained on the same by upright side-walls D. As the dough passes between the upper part of the feed-belt B and the roller $b^5$, it is pressed and squeezed toward the dough-dividing cylinder C, which is provided with a series of transverse pockets C' having sharp tapering edges C² between them for cutting the quantity required for the size of the loaves, rolls, or other articles to be produced from the dough.

When the dough-dividing cylinder C is made wide enough, two or more sets of pockets can be arranged on the same, but in this case one series of pockets is preferably made to alternate with the adjacent series of pockets, as shown clearly in Fig. 3, so that two or more sets of loaves, rolls, &c., can be produced by the rotation of the dough-dividing cylinder.

The cylinder C is rotated in contact with the feed-belt, which is bent in the shape of an arc at the point where it touches the circumference of the cylinder between the rollers $b'$ $b^2$, as shown in Fig. 2, so that the dough is pressed and shaped in uniform quantities in the pockets of the cylinder.

To secure the ready discharge of the divided dough from the pockets of the cylinder C, a small quantity of flour is delivered into the pockets from a box F arranged above the dough-dividing cylinder C, which flour-box is provided with a screen $f$ at its bottom. The flour-box F is supported on suitable upright yielding rods $f'$, which are attached to the supporting-frame A, and to which from time to time a vibrating motion is imparted by hand so as to sprinkle a quantity of flour into the pockets, which are then at the upper part of the dough-dividing cylinder. The dusting of the flour into the pockets permits the divided loaves, rolls, &c., to be readily delivered from the lower pockets of the cylinder C onto an endless belt E, which is stretched over a driving-roller $e$ and a stretching-roller $e'$, the driving-roller $e$ receiving motion by a train of gear-wheels $e^2$ from the gear-wheel $g$, so that continuous motion is imparted to the endless belt E, which moves the loaves or other articles forward for removal to the finishing-table, preparatory to being transferred to the oven. The tension of the endless conveying-belt E is regulated by suitable tension-regulating devices, such as T. The supporting-frame $E^2$ of the endless belt E is supported by bracket-arms $E^2$ that extend from the supporting-frame A to the sides of the frame $E'$, as shown clearly in Figs. 1 and 2.

By the machine described the dough prepared by the baker can be divided in a rapid and effective manner into the required size of loaves, rolls, &c., for being finished and transferred to the oven. Loaves of uniform size can be quickly turned out by the machine, so that a considerable saving of time and labor is obtained.

Having thus described my invention, I claim as new and desire to secure by Letters Patent—

1. In a dough-dividing machine, the combination of a dough feeding-belt, two adjacent rollers arranged at one end of the belt, a roller at the opposite end of the belt, said belt being stretched over said rollers, means for imparting forward motion to the belt, a rotary dough-dividing cylinder provided with a number of pockets in its circumference and rotating in contact with that portion of the feeding-belt which is between said two adjacent rollers, and a conveyer-belt for conducting the dough from said cylinder, substantially as set forth.

2. In a dough-dividing machine, the combination of an endless dough-feeding belt, two adjacent rollers arranged at one end of the belt, a tension-roller arranged at the other end of the belt, said belt being stretched over said rollers, a fourth weighted roller by which, in connection with the juxtaposed roller, motion is imparted to the feeding-belt, a dough regulating roller above the feeding-belt, a rotary dough-dividing cylinder provided with pockets and moving in contact with the feeding-belt at a point intermediately between said two adjacent rollers, and an endless conveyer-belt below the dough-dividing cylinder, substantially as set forth.

In testimony that I claim the foregoing as my invention I have signed my name in presence of two subscribing witnesses.

CARL HESSE.

Witnesses:
PAUL GOEPEL,
GEORGE W. JAEKEL.